United States Patent [19]

Lonis et al.

[11] Patent Number: 4,839,198
[45] Date of Patent: Jun. 13, 1989

[54] METHOD OF APPLYING A ROAD MARKING COMPOSITION

[75] Inventors: Carolus J. M. Lonis, Emst; Klaas Nieuwenhuis, Heerde, both of Netherlands

[73] Assignee: Akzo N.V., Netherlands

[21] Appl. No.: 853,079

[22] Filed: Apr. 19, 1986

[30] Foreign Application Priority Data

Apr. 17, 1985 [NL] Netherlands ............... 8501122

[51] Int. Cl.$^4$ ............... B05D 5/00; B05D 7/24
[52] U.S. Cl. ..................... 427/137; 427/341; 404/93; 404/94; 524/401; 523/172
[58] Field of Search ............... 427/137, 341; 260/998.19; 524/401; 523/172; 404/93, 94

[56] References Cited

U.S. PATENT DOCUMENTS

| 3,474,057 | 10/1969 | de Vries | 427/137 |
| 3,897,378 | 7/1975 | Scohy et al. | 260/998.19 |
| 4,384,056 | 5/1983 | Schmidt et al. | 523/221 |
| 4,415,603 | 11/1983 | Valiot et al. | 427/137 |

FOREIGN PATENT DOCUMENTS 1779 5/1979 European Pat. Off. ............ 427/137

OTHER PUBLICATIONS

Kirk-Othmer Encyclopedia of Chemical Technology, John Wiley & Sons, Inc., New York, (1969), vol. 18, p. 452.

Sawyer, Clair N. and McCarty, Perry L., "Chemistry for Sanitary Engineers", 2d ed., McGraw Hill, (1967), pp. 214–224.

Primary Examiner—Shrive P. Beck
Attorney, Agent, or Firm—Jeffrey S. Boone; Louis A. Morris

[57] ABSTRACT

A road marking composition is applied by applying (1) an aqueous dispersion of a film forming binder and (2) a water soluble salt. The process of the invention provides rapid drying, and the dried composition is not prone to smearing or adhesion of dirt.

11 Claims, No Drawings

METHOD OF APPLYING A ROAD MARKING COMPOSITION

BACKGROUND OF THE INVENTION

The invention relates to a method of applying a road marking composition. In view of environmental pollution, solvent-containing compositions used up to now are considered more and more objectionable. Inherent in the main alternative, however, viz. conventional aqueous compositions, there is the disadvantage that in actual practice the drying time is both uncontrollable and unacceptably long; generally a few hours, depending on the weather conditions and the state of the road surface. A short drying time is essential, in that after application of the road marking composition, the road must as soon as possible be reopened to traffic. Road authorities generally require that the composition should not take more than 30 minutes for it to be completely dry, and that when the road is normally used it should not give rise to smearing or adhesion of dirt.

SUMMARY OF THE INVENTION

The invention has for its object to provide a method by which the road markings obtained are dry within a very short time, for instance within about 15 minutes after application of the marking composition and do not give rise to smearing or adhesion of dirt. Another advantage to the method of the invention consists in that the road marking composition can also be successfully applied to a wet road surface or when there is some light rain or snow. Still another advantage is that 5 minutes after the road marking composition has been applied it will not flow out in a rain shower. As a result, progress of this kind of road work can be better controlled.

The method according to the invention is characterized in that an aqueous composition based on a dispersion of a film forming binder of a minimum film forming temperature of 0°-60° C. and 30-70% by volume of filler, calculated on the solid binder, is applied to the road surface and contacted with a water soluble salt.

DETAILED DESCRIPTION OF THE INVENTION

For the marking composition, use may generally be made of any suitable dispersion of a film forming binder of the desired minimum film forming temperature, for instance, and aqueous polyvinyl acetate dispersion or an aqueous poly(meth)acrylate dispersion. More particularly, use is made of an aqueous dispersion of a styrene-acrylate copolymer, which polymer is built up from 20-80% by weight of a monovinyl aromatic compound containing 8-11 carbon atoms, such as styrene, α-methyl styrene and/or vinyl toluene, 80-20% by weight of an alkyl(meth)acrylate, of which the alkyl group has 1-6 carbon atoms and 0-30% by weight of a different copolymerizable monomer such as acrylic acid, methacrylic acid, maleic acid or vinyl acetate. The minimum film forming temperature of the aqueous dispersion is preferably 0°-30° C. The aqueous dispersion may contain any suitable stabilizer, but preferably an ionic, more particularly an anionic stabilizer, optionally together with a nonionic stabilizer. It is preferred that the ionic stabilizer should be used in an amount by weight not higher than 5%, more particularly 1-3%, calculated on the film forming binder. Use is made of a nonionic stabilizer in an amount by weight of 0-2%, more particularly not higher than 1%, calculated on the film forming binder. It is preferred that use should be made of an aqueous dispersion, of which 100 parts by weight (calculated on solid matter) can be coagulated with not more than 25 ml of an aqueous 75% by weight solution of calcium chloride, more particularly 5-20 ml of such a calcium chloride solution.

As suitable cationic stabilizers may be mentioned salts of fatty amines, fatty acid amino amides, hydroxyalkyl imidazolidines, amino alkyl imidazolines and quaternary ammonium compounds. Examples of suitable anionic stabilizers include sodium lauryl sulphate, dioctyl sulphosuccinate, sulphated or sulphonated fatty alcohols, sulphonated fatty acids, sodium dodecyl benzene sulphonate and nonyl phenol-polyethylene oxide sulphates having not more 5 ethylene oxide units. As suitable nonionic stabilizers may be mentioned ethoxylated alkyl phenols, ethoxylated fatty alcohols and ethylene oxide-propylene oxide block copolymers. The stabilizers referred to above are known to the man skilled in the art and need not be further described here.

According to the invention the composition to be applied also contains 30-70, preferably 35-55 percent by volume of filler, calculated on the solid binder. By fillers are to be understood here pigments such as titanium dioxide, chrome yellow, chrome orange, phthalocyanine blue, chromium oxide and iron oxide, and extenders such as solid polymeric additives, silicates, silicium dioxide, talc, barium sulphate, calcium carbonate, silicium carbide and corundum, or mixtures of the above fillers.

The marking composition may optionally contain still other additives, such as anti-foaming agents, wetting agents, emulsion stabilizers, liquid polymer additives and organic solvents. The marking composition generally has a viscosity of 40-140, preferably 55-90 Krebs units.

Examples of suitable watersoluble salts that may used according to the invention include sodium chloride, sodium acetate, ammonium chloride, calcium chloride, hydroxyl ammonium chloride, ammonium thiocyanate, ammonium sulphate, zinc acetate, aluminium chloride and aluminium sulphate. It is preferred that use should be made of a salt which has a solubility in water at 0° C. of 30-300, particularly of 30-100 g per 100 g of water. More particularly, use is made of sodium chloride, calcium chloride or zinc acetate. Optionally, use may be made of mixtures.

The method of the invention may be carried out in any convenient manner, for instance by first applying the marking composition to the road surface, preferably by spraying, and subsequently scattering salt in solid form onto it or applying an aqueous solution of the salt to the wet marking composition, for instance by spraying. The aqueous marking composition may optionally be mixed with an aqueous solution of the salt, for instance with the aid of a 2-component mixing head, immediately before the marking composition is applied to the road surface.

After the marking composition has been applied to the road surface, the road marking may optionally be provided with the usual reflective spheres or some anti-skid agent. These last-mentioned components may be provided before, during or after contacting the marking composition with the watersoluble salt.

The process according to the invention may be applied to any type of road surface, such as that of concrete, asphalt, bitumen, bricks, cobbles, tiles and steel plates. The marking composition is usually applied in a conventional layer thickness of about 50–500 μm, preferably 100–350 μm (after drying).

The invention will be further described in the following examples, which are not to be construed as limiting the invention. The term "parts" used therein refers to "parts by weight".

EXAMPLE 1

An aqueous marking composition made up of 30 parts of a 50% by weight aqueous dispersion of a copolymer built up from 48% by weight of styrene, 50% by weight of methyl methacrylate and 2% by weight of methacrylic acid, and brought to a pH of 8 with ammonia, 12 parts of titanium dioxide, 32 parts of silicium dioxide, 12 parts of talc, 6 parts of butyl ether of ethylene glycol and so many parts of water that the composition had a viscosity of 75 Krebs units, which composition was applied to a concrete road surface in a layer thickness of 200 μm (after drying). Subsequently, at a temperature of 10° C. the composition was scattered with 15 g of solid sodium chloride having a particle size of 100–300 μm per $m^2$ of the applied marking composition. Per 100 parts of sodium chloride there were intermixed 230 parts of calcined sand as anti-skid agent having a particle size of 300–800 μm and 440 parts of reflective spheres having a diameter of 300–800 μm. Within 6 minutes the road marking could be driven on without causing any smearing or adhesion of dirt.

EXAMPLE 2

Example 1 was repeated, except that use was made of the sodium chloride as a 25% by weight-aqueous solution without any further additives. This solution was applied by spraying in an amount of 100 g per $m^2$ of the applied marking composition. Prior to spraying, the surface of the composition had been provided with 20 g of the sand and 80 g of the reflective spheres per $m^2$ of the applied composition. Within 6 minutes the road marking could be driven on without causing any smearing or adhesion of dirt.

EXAMPLE 3

Example 2 was repeated, except that use was made of a 25% by weight-aqueous solution of calcium chloride in an amount of 90 g per $m^2$ of the applied composition. The same results were obtained.

EXAMPLE 4

Example 1 was repeated, except that use was made of solid zinc acetate of a particle size of 100–300 μm, instead of sodium chloride. The road surface consisted of steel plates. The same results were obtained and there was found to be no formation of rust.

We claim:

1. A method of applying a road marking composition comprising applying to a road surface an aqueous composition comprising a dispersion of a film forming binder having a minimum film forming temperature of 0°–60° C., and 30–70 percent by volume of filler calculated on the solid binder, and contacting the aqueous composition with a water soluble salt.

2. The method of claim 1, wherein the dispersion of the film forming binder has a minimum film forming temperature of 0°–30° C.

3. The method of claim 1, wherein the film forming binder comprises a copolymer built up from 20–80% by weight of a monovinyl aromatic compound containing 8–11 carbon atoms, 80–20% by weight of an alkyl(-meth)acrylate of which the alkyl group has 1–6 carbon atoms, and 0–30% by weight of a different copolymerizable monomer.

4. The method of claim 1, wherein the aqueous composition contains 35–55 percent by volume of filler.

5. The method of claim 1, wherein the water soluble salt has a solubility in water at 0° of 30–300 g per 100 g of water.

6. The method of claim 1, wherein the water soluble salt used is sodium chloride, calcium chloride or zinc acetate.

7. The method of claim 1 wherein the aqueous composition is first applied to the road surface and the water soluble salt is thereafter applied to the aqueous composition.

8. The method of claim 7, wherein the water soluble salt is in the form of an aqueous solution.

9. The method of claim 7, wherein the water soluble salt is in the form of a solid.

10. The method of claim 1, wherein the water soluble salt is in the form of an aqueous solution and the water soluble salt and the aqueous composition are mixed immediately prior to the application to the road surface.

11. A method of applying a road marking composition comprising (a) applying to a road surface an aqueous composition comprising (i) a dispersion of a film forming binder having a minimum film forming temperature of 0°–60° C., and (ii) 30–70 percent by volume of filler calculated on the solid binder; said aqueous composition substantially not containing a photoinitiator/peroxide blend; and (b) contacting the aqueous composition with a water soluble salt.

* * * * *

UNITED STATES PATENT AND TRADEMARK OFFICE
CERTIFICATE OF CORRECTION

PATENT NO. : 4,839,198
DATED : June 13, 1989
INVENTOR(S) : Carolus Johannes Maria Lonis and Klaas Nieuwenhuis It is certified that error appears in the above-identified patent and that said Letters Patent is hereby corrected as shown below:

On the title page, item [22]:

Change filing date from April 19, 1986 to April 17, 1986.

Signed and Sealed this

Seventeenth Day of April, 1990

Attest:

HARRY F. MANBECK, JR.

*Attesting Officer*  *Commissioner of Patents and Trademarks*